(12) United States Patent
Han et al.

(10) Patent No.: US 10,936,116 B2
(45) Date of Patent: Mar. 2, 2021

(54) ELECTRONIC CONFERENCE APPARATUS FOR GENERATING HANDWRITING INFORMATION BASED ON SENSED TOUCH POINT, METHOD FOR CONTROLLING SAME, AND DIGITAL PEN

(71) Applicant: SAMSUNG ELECTRONICS CO., LTD., Suwon-si (KR)

(72) Inventors: Young-ran Han, Suwon-si (KR); Dai-boong Lee, Hwaseong-si (KR); Min-chul Jung, Suwon-si (KR); Yong-hun Choi, Hwaseong-si (KR); Jung-hyun Choi, Seoul (KR); Kyoung-oh Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/740,473

(22) Filed: Jun. 16, 2015

(65) Prior Publication Data

US 2016/0099983 A1    Apr. 7, 2016

(30) Foreign Application Priority Data

Oct. 7, 2014    (KR) .................. 10-2014-0135167

(51) Int. Cl.
*G06F 3/041*    (2006.01)
*G06F 3/046*    (2006.01)
(Continued)

(52) U.S. Cl.
CPC .......... *G06F 3/04162* (2019.05); *G06F 3/038* (2013.01); *G06F 3/03545* (2013.01);
(Continued)

(58) Field of Classification Search
CPC ....... G06F 3/046; G06F 1/1626; G06F 1/1632
(Continued)

(56) References Cited

U.S. PATENT DOCUMENTS 5,247,371 A * 9/1993 Hikawa ................ G03G 15/507
                                                                    358/448
5,294,792 A    3/1994 Lewis et al.
(Continued)

FOREIGN PATENT DOCUMENTS

CN          1512314 A    7/2004
CN       101847057 A    9/2010
(Continued)

OTHER PUBLICATIONS

International Search Report dated Dec. 18, 2015, by International Searching Authority in counterpart International Application No. PCT/KR2015/007322. (PCT/ISA/210).
(Continued)

*Primary Examiner* — William D Titcomb
(74) *Attorney, Agent, or Firm* — Sughrue Mion, PLLC (57) ABSTRACT

An electronic conference apparatus, a method for controlling the same, and a digital pen are provided. The electronic conference apparatus includes a sensor configured to sense a touch point of a digital pen through first hand writer during a period in which handwriting is input to paper through second hand writer. The electronic conference apparatus further includes a controller configured to generate handwriting information based on the sensed touch point, and a communicator configured to transmit the handwriting information.

11 Claims, 10 Drawing Sheets

(51) Int. Cl.

| | | |
|---|---|---|
| *G06F 3/0488* | (2013.01) | |
| *G06F 3/0354* | (2013.01) | |
| *G06F 3/0481* | (2013.01) | |
| *G09B 5/00* | (2006.01) | |
| *G09B 11/00* | (2006.01) | |
| *G09B 11/02* | (2006.01) | |
| *G06F 40/166* | (2020.01) | |
| *G06F 3/038* | (2013.01) | |
| *G06F 3/0484* | (2013.01) | |
| *H04L 12/58* | (2006.01) | |
| *H04L 29/06* | (2006.01) | |

(52) U.S. Cl.
CPC ............ *G06F 3/046* (2013.01); *G06F 3/0481* (2013.01); *G06F 3/0484* (2013.01); *G06F 3/04883* (2013.01); *G06F 40/166* (2020.01); *G09B 5/00* (2013.01); *G09B 11/00* (2013.01); *G09B 11/02* (2013.01); *H04L 51/04* (2013.01); *H04L 65/403* (2013.01); *H04L 65/601* (2013.01); *G06F 2203/0383* (2013.01)

(58) Field of Classification Search
USPC .......................................................... 715/752
See application file for complete search history.

(56) References Cited

U.S. PATENT DOCUMENTS

| | | | |
|---|---|---|---|
| 6,924,442 B2 | 8/2005 | Nakano et al. | |
| 8,126,965 B2 | 2/2012 | Hu et al. | |
| 8,275,197 B2 | 9/2012 | Hawkins et al. | |
| 8,731,299 B2 | 5/2014 | Hawkins et al. | |
| 8,970,540 B1* | 3/2015 | Hebenstreit et al. | 345/174 |
| 9,098,131 B2 | 8/2015 | Jeong | |
| 9,360,694 B2 | 6/2016 | Han et al. | |
| 9,640,144 B2 | 5/2017 | Shimizu et al. | |
| 10,222,925 B2 | 3/2019 | Han et al. | |
| 2002/0074171 A1 | 6/2002 | Nakano et al. | |
| 2002/0107885 A1 | 8/2002 | Brooks et al. | |
| 2003/0117381 A1* | 6/2003 | Wu et al. | 345/179 |
| 2005/0231488 A1* | 10/2005 | Chou | G06F 3/03545 345/179 |
| 2006/0233441 A1 | 10/2006 | Clary | |
| 2007/0058868 A1* | 3/2007 | Seino | G06F 3/0317 382/187 |
| 2007/0067707 A1* | 3/2007 | Travis et al. | 715/500.1 |
| 2008/0203175 A1 | 8/2008 | Hu et al. | |
| 2008/0240569 A1* | 10/2008 | Tonouchi | G06K 9/00402 382/186 |
| 2009/0309956 A1 | 12/2009 | Hawkins et al. | |
| 2010/0039296 A1* | 2/2010 | Marggraff et al. | 341/20 |
| 2010/0051356 A1 | 3/2010 | Stern | |
| 2010/0155153 A1 | 6/2010 | Zachut | |
| 2011/0036648 A1 | 2/2011 | Chen et al. | |
| 2011/0084846 A1 | 4/2011 | Li et al. | |
| 2011/0084942 A1* | 4/2011 | Liu et al. | 345/179 |
| 2011/0216032 A1* | 9/2011 | Oda | G06F 3/044 345/174 |
| 2012/0162351 A1* | 6/2012 | Feldman et al. | 348/14.03 |
| 2012/0166968 A1* | 6/2012 | Lee | G06F 3/04883 715/752 |
| 2012/0169642 A1 | 7/2012 | Lee | |
| 2013/0004069 A1 | 1/2013 | Hawkins et al. | |
| 2013/0162606 A1* | 6/2013 | Araumi | G06F 3/041 345/179 |
| 2013/0257777 A1* | 10/2013 | Benko et al. | 345/173 |
| 2014/0043547 A1 | 2/2014 | Marhefka | |
| 2014/0132529 A1 | 5/2014 | Jeong | |
| 2014/0152543 A1* | 6/2014 | Hirabayashi | G06F 3/1462 345/156 |
| 2014/0241591 A1* | 8/2014 | Matsuki | 382/115 |
| 2014/0267060 A1* | 9/2014 | Li | G06F 3/0416 345/173 |
| 2014/0294306 A1 | 10/2014 | Fujita | |
| 2015/0002435 A1* | 1/2015 | Shimizu | G06F 3/04883 345/173 |
| 2015/0042602 A1* | 2/2015 | Kim | G06F 3/044 345/174 |
| 2015/0277583 A1* | 10/2015 | Kasahara | G06K 9/00 345/179 |
| 2016/0048247 A1 | 2/2016 | Han et al. | |

FOREIGN PATENT DOCUMENTS

| | | |
|---|---|---|
| CN | 102602200 A | 7/2012 |
| CN | 202480641 U | 10/2012 |
| EP | 0655674 A2 | 5/1995 |
| JP | 5-341902 A | 12/1993 |
| JP | 2001-282443 A | 10/2001 |
| JP | 2001-312340 A | 11/2001 |
| JP | 2001-313761 A | 11/2001 |
| JP | 2002-207565 A | 7/2002 |
| JP | 2002-297301 A | 10/2002 |
| JP | 2008-217782 A | 9/2008 |
| JP | 2010-72841 A | 4/2010 |
| JP | 2010-154089 A | 7/2010 |
| JP | 2012-11245 A | 1/2012 |
| JP | 2012-252459 A | 12/2012 |
| JP | 2013-25659 A | 2/2013 |
| JP | 5319458 B2 | 10/2013 |
| JP | 2014135019 A | 7/2014 |
| JP | 2014-146233 A | 8/2014 |
| JP | 2014-191662 A | 10/2014 |
| KR | 10-1108266 B1 | 4/2012 |
| KR | 10-2012-0079598 A | 7/2012 |
| KR | 10-2014-0060933 A | 5/2014 |
| KR | 10-1431688 B1 | 8/2014 |
| KR | 10-2016-0021572 A | 2/2016 |
| RU | 2422785 C1 | 6/2011 |
| RU | 2 500 986 C2 | 12/2013 |
| RU | 2 505 852 C2 | 1/2014 |
| WO | 9923546 A1 | 5/1999 |
| WO | 2006/012677 A1 | 2/2006 |
| WO | 2013/121455 A1 | 8/2013 |

OTHER PUBLICATIONS

Written Opinion dated Dec. 18, 2015, by International Searching Authority in counterpart International Application No. PCT/KR2015/007322. (PCT/ISA/237).
Communication dated Feb. 18, 2016, by the European Patent Office in counterpart European Application No. 15183009.8.
Communication dated Dec. 2, 2015, by the Korean Intellectual Property Office in counterpart Korean Application No. 10-2014-0135167.
Communication dated Jun. 22, 2016, issued by the European Patent Office in counterpart European Application No. 15183009.8.
Communication dated Sep. 5, 2017 by the Intellectual State Property Office of P.R.. China in counterpart Chinese Patent Application No. 201510598967.9.
Communication dated Feb. 17, 2017 issued by the European Patent Office in counterpart European Patent Application No. 15 183 009.8.
Communication dated Mar. 9, 2018 issued by the European Patent Office in counterpart European Patent Application No. 17208170.5.
EpsonTV, "Epson's BrightLink Pro Interactive Whiteboard—See it in Action", YouTube, Sep. 16, 2014, XP054976350, retrieved from the Internet: URL:https://www.youtube.com/watch?v=FZyhj U 2mLgl [retrieved Feb. 3, 2016].
MimioClassroom, "MimioPad wireless pen tablet", YouTube, Dec. 8, 2013, XP054976351, retrieved from the Internet: URL:https://www.youtube.com/watch?v=9UAv5LOknUA [retrieved Feb. 3, 2016].
Communication dated Jun. 5, 2018, issued by the State Intellectual Property Office of the People's Republic of China in counterpart Chinese Patent Application No. 201510598967.9.
Communication dated Sep. 27, 2018, issued by the European Patent Office in counterpart European Application No. 17208170.5.

(56) References Cited

OTHER PUBLICATIONS

Communication dated Feb. 26, 2019 issued by the Russian Intellectual Property Office in counterpart Russian Application No. 2017107203.
Communication dated Mar. 25, 2019 issued by the Japanese Intellectual Property Office in counterpart Japanese Application No. 2017-518520.
Communication dated Apr. 4, 2019 issued by the State Intellectual Property Office of P.R. China in counterpart Chinese Application No. 201510598967.9.
Communication dated Sep. 4, 2019, issued by the State Intellectual Property Office of P.R. China in counterpart Chinese Application No. 201510598967.9.
Communication dated Sep. 30, 2019 issued by the Japanese Patent Office in counterpart Japanese Application No. 2017-518520.
Communication dated Oct. 23, 2019 issued by the Russian Patent Office in counterpart Russian Application No. 2017107203.
Communication dated Mar. 5, 2020 issued by the European Patent Office in counterpart European Patent Application No. 19207899.6.
Communication dated Dec. 4, 2019 issued by the State Intellectual Property Office of P.R. China in counterpart Chinese Patent Application No. 201510598967.9.
Communication dated Jan. 27, 2020 issued by the Japanese Patent Office in counterpart Japanese Patent Application No. 2017-518520.
Communication dated Aug. 11, 2020, issued by the Japanese Patent Office in Japanese Application No. 2017-518520.
Communication dated Nov. 4, 2020 issued by the European Patent Office in European Patent Application No. 19207899.6.

\* cited by examiner

ELECTRONIC CONFERENCE APPARATUS FOR GENERATING HANDWRITING INFORMATION BASED ON SENSED TOUCH POINT, METHOD FOR CONTROLLING SAME, AND DIGITAL PEN

CROSS-REFERENCE TO RELATED APPLICATION

This application claims priority from Korean Patent Application No. 10-2014-0135167, filed on Oct. 7, 2014, in the Korean Intellectual Property Office, the disclosure of which is incorporated herein by reference in its entirety.

BACKGROUND

Field

Apparatuses and methods consistent with exemplary embodiments relate to an electronic conference apparatus, a method for controlling the same, and a digital pen.

Description of the Related Art

There are various ways for performing a touch input to a user terminal apparatus. For example, the user terminal apparatus may sense a touch input using a hand of a person, or sense a touch input using a digital pen.

In the case of the touch input using the digital pen, a technology of sensing a region touched by the digital pen has been developed, but there may be a problem that a natural feature given by an actual pen input using an existing pencil or an existing ball point pen is not provided. Meanwhile, in the case of an existing electronic conference system, people have confirmed handwriting information input by using at least one user terminal apparatus (for example, a laptop computer, a tablet, or the like) through a display apparatus, and have performed a conference. However, in the case of performing the conference by using at least one user terminal apparatus, whenever the conference is performed, the user terminal apparatus should be connected, which may be troublesome.

Therefore, it has been need to build a system capable of performing an electronic conference by using a digital pen providing a natural feature similar to an actual pen input.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide an electronic conference apparatus, a method for controlling the same, and a digital pen in which a plurality of users may perform a conference by using handwriting information sensed while a user actually handwrites the handwriting information on paper.

According to an aspect of an exemplary embodiment, there is provided an electronic conference apparatus including a sensor configured to sense a touch point of a digital pen through first hand writer during a period in which handwriting is input to paper through second hand writer. The electronic conference apparatus further includes a controller configured to generate handwriting information based on the sensed touch point, and a communicator configured to transmit the handwriting information.

The sensor may be configured to sense the touch point based on an electromagnetic resonance scheme.

The electronic conference apparatus may include a plurality of sensors including the sensor, each of the plurality of sensors may have identification (ID) information, and the controller may be configured to generate the handwriting information based on the ID information of the sensor and the sensed touch point.

The electronic conference apparatus may further include an inputter comprising any one or any combination of a button corresponding to a display function, a button corresponding to an e-mail transmission function, a button corresponding to a storing function, a button corresponding to an individual transmission function, and a button corresponding to a deleting function.

The controller may be configured to control the communicator to transmit the handwriting information to an external display apparatus in response to a selection of the button corresponding to the display function.

The display apparatus may display the handwriting information based on identification information of the sensor.

The controller may be configured to control the communicator to transmit the handwriting information to an e-mail in response to a selection of the button corresponding to the e-mail transmission function.

The electronic conference apparatus may further include a storage, and the controller may be configured to store the handwriting information in the storage in response to a selection of the button corresponding to the storing function.

The controller may be configured to control the communicator to transmit the handwriting information to a terminal in response to a selection of the button corresponding to the individual transmission function.

The controller may be configured to delete the handwriting information in response to a selection of the button corresponding to the deleting function.

The electronic conference apparatus may further include a motion sensor configured to sense a motion, and the controller may be configured to store the handwriting information generated up to a point in time in which a motion of turning over the paper is sensed by the motion sensor, and generate new handwriting information based on a new touch point of the digital pen that is sensed by the sensor through the first portion of the digital pen.

The electronic conference apparatus may further include a near field communicator configured to sense information of the paper from a near field communication module attached to the paper, and the controller may be configured to store the sensed information of the paper with the handwriting information.

The electronic conference apparatus may further include a user authenticator configured to authenticate a user of the digital pen, and the controller may be configured to store information of the authenticated user with the handwriting information.

The handwriting information may include any one or any combination of coordinates of the sensed touch point, user information, and identification information of the sensor.

According to an aspect of an exemplary embodiment, there is provided a method for controlling an electronic conference apparatus, the method including sensing a touch point of a digital pen through first hand writer during a period in which handwriting is input to paper through second hand writer. The method further includes generating handwriting information based on the sensed touch point, and transmitting the handwriting information.

The sensing may include sensing the touch point based on an electromagnetic resonance scheme.

The method may further include authenticating a user of the digital pen, and storing information of the authenticated user with the handwriting information.

According to an aspect of an exemplary embodiment, there is provided a digital pen including a first handwriter configured to input handwriting to paper, and a second handwriter configured to input the handwriting based on an electromagnetic resonance scheme. The digital pen further includes a pressure-sensitive sensor configured to sense the handwriting being input to the paper through the first handwriter, and a controller configured to activate the second handwriter in response to the handwriting being sensed to be input to the paper through the first handwriter.

The second handwriting unit may include a resonance circuit, and the controller may be configured to activate the resonance circuit in response to the handwriting being sensed to be input to the paper through the first handwriter.

According to an aspect of an exemplary embodiment, there is provided an electronic conference apparatus including a sensor configured to sense handwriting of a digital pen based on a magnetic field generated by the digital pen while the handwriting is input to paper with the digital pen. The electronic conference apparatus further includes a controller configured to generate handwriting information based on the sensed handwriting, and process the handwriting information based on an input.

The handwriting information may include the handwriting and identification information of the sensor.

The controller may be configured to transmit the handwriting information to any one or any combination of an external display apparatus, an e-mail, and a terminal based on the input.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that the terms "comprises" and/or "comprising" used herein specify the presence of stated features or components, but do not preclude the presence or addition of one or more other features or components. In addition, the terms such as "unit", "-er (-or)", and "module" described in the specification refer to an element for performing at least one function or operation, and may be implemented in hardware, software, or the combination of hardware and software.

Figure 1:
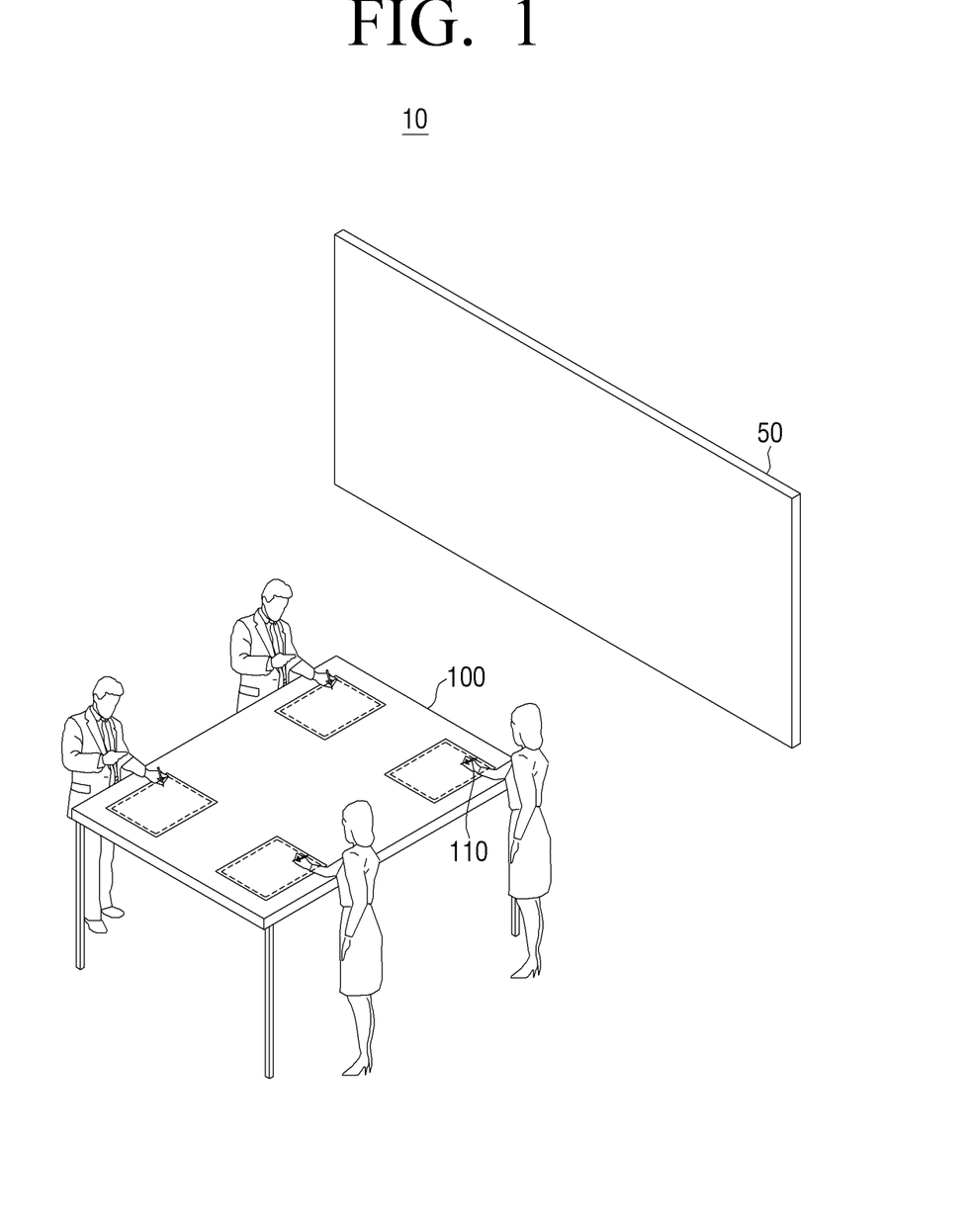
FIG. 1 is a view illustrating an electronic conference system according to an exemplary embodiment.

FIG. 1 is a view illustrating an electronic conference system 10 according to an exemplary embodiment. As illustrated in FIG. 1, the electronic conference system 10 is configured to include an electronic conference apparatus 100 and digital pens including a digital pen 110.

The digital pen 110 includes a first handwriting unit that may directly input handwriting information on paper by using ink or graphite, and a second handwriting unit inputs handwriting information on the electronic conference apparatus 100 through touch sensing.

The electronic conference apparatus 100 includes a sensor that performs the touch sensing through the second handwriting unit of the digital pen 110. Here, the sensor may sense a touch point input through the second handwriting unit by using an electromagnetic resonance (EMR) scheme.

The electronic conference apparatus 100 may be implemented in a desk form, as illustrated in FIG. 1. Here, in the case in which a user performs handwriting by using the digital pen 110 in a state in which paper is positioned on the sensor of the electronic conference apparatus 100, the first handwriting unit of the digital pen 100 may directly input handwriting information to the paper by using the ink. In addition, during a period in which the handwriting information is directly input to the paper by using the ink through the first handwriting unit of the digital pen 110, the sensor of the electronic conference apparatus 100 may sense a touch point input through the second handwriting unit. The electronic conference apparatus 100 may generate handwriting information based on the touch point input through the second handwriting unit.

In addition, the electronic conference apparatus 100 may transmit the generated handwriting information to the outside, store the generated handwriting information therein, and/or delete the generated handwriting information, depending on a user command therefrom. The electronic conference apparatus 100 may transmit the handwriting information to an external display apparatus 50 (for example, an electronic board or the like) to allow the display apparatus 50 to display the handwriting information, as illustrated in FIG. 1. In addition, the electronic conference apparatus 100 may transmit the handwriting information to a preset e-mail or to a preset terminal of another user.

The electronic conference apparatus 100 may include a plurality of sensors. That is, the electronic conference apparatus 100 may input the handwriting information through different sensors per user. In the case in which a plurality of users input the handwriting information through the plurality of sensors, the electronic conference apparatus 100 may store unique identification (ID) information corresponding to the sensors together with the handwriting information therein. Therefore, in the case in which the external display apparatus 50 displays the handwriting information, the display apparatus 50 may differently display the handwriting information per user based on the ID information. For example, the display apparatus 50 may differently set colors, transparencies, contrasts, and the like, per user to display the handwriting information.

The electronic conference apparatus 100 may be implemented in the desk form as illustrated in FIG. 1. However, this is only an example. That is, the electronic conference apparatus 100 may be implemented in a board form in which it is attached to a wall or be provided in the wall.

Figure 2:
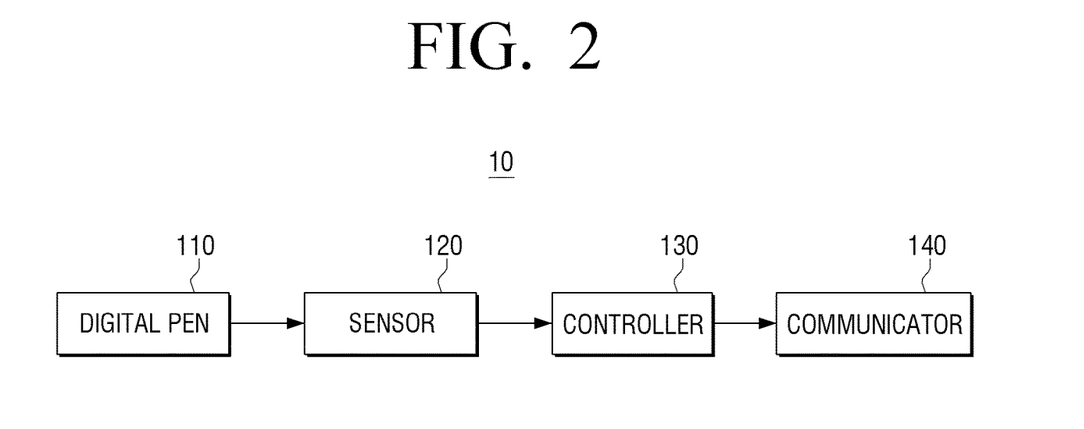
FIG. 2 is a block diagram schematically illustrating a configuration of the electronic conference system according to an exemplary embodiment.

FIG. 2 is a block diagram illustrating a configuration of the electronic conference system 10 according to an exemplary embodiment. As illustrated in FIG. 2, the electronic conference system 10 is configured to include the digital pen 110, a sensor 120, a controller 130, and a communicator 140. The sensor 120, the controller 130, and the communicator 140 may be included in the electronic conference apparatus 100.

The digital pen 110 includes the first handwriting unit inputting the handwriting information by using the ink, and the second handwriting unit inputting the handwriting information by using the touch sensing. The digital pen 110 may include a pressure-sensitive sensor sensing that the handwriting information is input to the paper by using the first handwriting unit, and may activate the second handwriting unit to allow the sensor 120 to sense a touch input, in the case in which it is sensed through the pressure-sensitive sensor that the user inputs the handwriting information to the paper by using the first handwriting unit.

The sensor 120 senses the touch input through the second handwriting unit of the digital pen 110. The sensor 120 may sense the touch input using the digital pen 110 by using an electromagnetic resonance scheme so as to sense the touch input without being directly contacted by the digital pen 110. In detail, when an induction magnetic field is generated from the second handwriting unit of the digital pen 110, the sensor 120 may obtain a coordinate value at which the generated induction magnetic field is sensed.

The sensor 120 may include a plurality of sensors.

The communicating unit 140 performs communication with various external apparatuses. For example, the communicating unit 140 may perform communication with an external display apparatus (e.g., an electronic board), an external user terminal, an external e-mail server, and the like.

The controller 130 controls an operation of the electronic conference system 10. The controller 130 generates the handwriting information by using the touch point sensed by the sensor 120. Here, the handwriting information may include at least one of coordinate value information on the touch point sensed by the sensor 120, user information, and ID information of the sensor 120.

The controller 130 may perform at least one of a display function, an e-mail transmission function, a storing function, an individual transmission function, and a deleting function by using the handwriting information depending on a user command.

For example, when the user command corresponding to the display function is input, the controller 130 may control the communicating unit 140 to transmit the handwriting information to the external display apparatus 50. In another example, when the user command corresponding to the e-mail transmission function is input, the controller 130 may control the communicating unit 140 to transmit the handwriting information to a preset e-mail account (for example, a user's e-mail account). In another example, when the user command for selecting a button corresponding to the storing function is input, the controller 130 may store the handwriting information in the electronic conference apparatus 100. In another example, when the user command corresponding to the individual transmission function is input, the controller 130 may control the communicating unit 140 to transmit the handwriting information to a terminal of a preset individual. In another example, when the user command for selecting the button corresponding to the deleting function is input, the controller 130 may delete the handwriting information.

As described above, the controller 130 provides various functions for the handwriting information input by the user.

Figure 3:
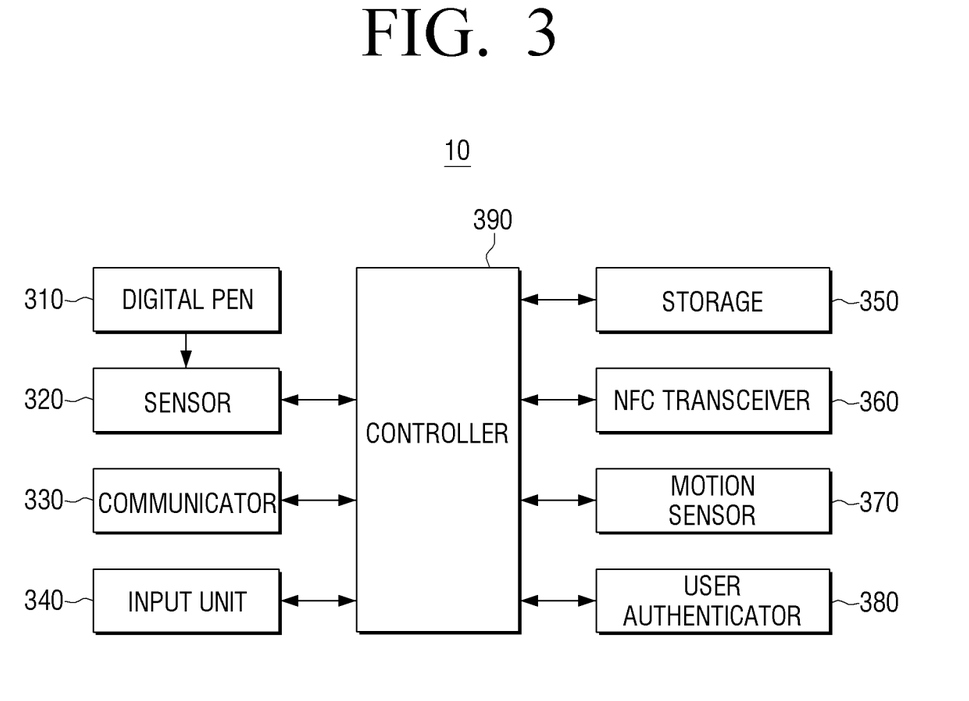
FIG. 3 is a block diagram illustrating a configuration of the electronic conference system according to an exemplary embodiment in detail.

FIG. 3 is a block diagram illustrating a configuration of the electronic conference system 10 according to an exemplary embodiment in detail. As illustrated in FIG. 3, the electronic conference system 10 is configured to include a digital pen 310, a sensor 320, a communicating unit 330 or communicator, an input unit 340 or inputter, a storage 350, a near field communication (NFC) transceiver 360, a motion sensor 370, a user authenticator 380, and a controller 390. The sensor 320, the communicator 330, the input unit 340, the storage 350, the NFC transceiver 360, the motion sensor 370, the user authenticator 380, and the controller 390 may be included in the electronic conference apparatus 100.

The digital pen 310 inputs the handwriting information to the electronic conference apparatus 100 by using the touch sensing while handwriting is directly input to paper by using ink. The digital pen 310 will be described in detail with reference to FIG. 4.

Figure 4:
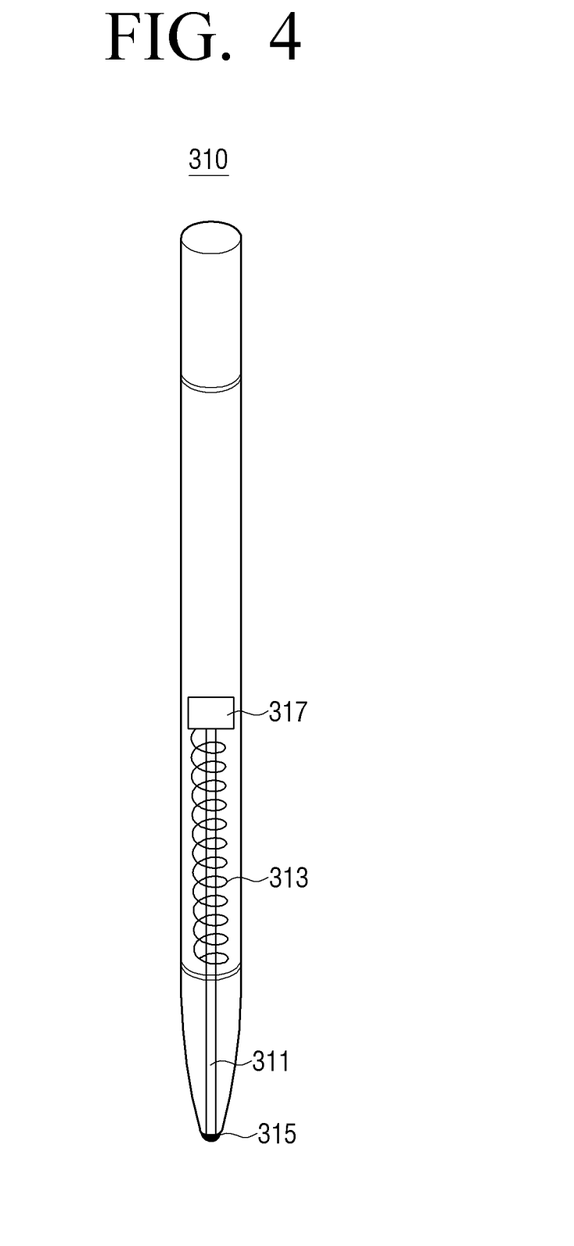
FIG. 4 is a view illustrating a configuration of a digital pen according to an exemplary embodiment.

FIG. 4 is a view illustrating a configuration of the digital pen 310 according to an exemplary embodiment. The digital pen 310 includes a first handwriting unit 311 or first handwriter, a second handwriting unit 313 or second handwriter, a pressure-sensitive sensor 315, and a controller 317 or controller.

The first handwriting unit 311 may directly perform the handwriting on the paper by using ink or graphite. In the case in which the first handwriting unit 311 performs the handwriting by using the ink, the digital pen may include an ink ball disposed at a tip portion thereof, and include an ink cartridge disposed at a body portion thereof.

The second handwriting unit 313 inputs the handwriting information to the electronic conference apparatus 100 by using the electromagnetic resonance scheme so the touch input is sensed without allowing the digital pen 310 to directly contact the sensor 320. In detail, since the digital pen 310 may not contact the sensor 320 during a period in which the digital input 310 inputs the handwriting information to the paper, the second handwriting unit 313 uses the electromagnetic resonance scheme, which is a contactless scheme.

The second handwriting unit 313 includes a resonance circuit for generating an induction magnetic field. In detail, in the case in which it is sensed by the pressure-sensitive sensor 315 that the user inputs the handwriting information to the paper through the first handwriting unit 311, the second handwriting unit 313 may apply a current to the resonance circuit to generate the induction magnetic field. In another example, the second handwriting unit 313 may generate an inductance current through a magnetic field generated by a loop coil included in the sensor 320.

Although the case in which the resonance circuit is disposed at a body of the digital pen 310 has been illustrated in FIG. 4, this is only an example. That is, the resonance circuit may be disposed at a pen point portion of the digital pen 310.

The pressure-sensitive sensor 315 senses whether or not the handwriting information is input to the paper by using the first handwriting unit 311. The pressure-sensitive sensor 315 may be disposed at the pen point portion of the digital pen 310, as illustrated in FIG. 4. In the case in which the first handwriting unit 311 is implemented by the ink, the pressure-sensitive sensor 315 may sense whether or not the user inputs the handwriting information to the paper by using the first handwriting unit 311 based on whether or not the ink ball senses pressure.

In the case in which it is decided through the pressure-sensitive sensor 315 that the user inputs the handwriting information to the paper by using the first handwriting unit 311, the controller 317 activates the resonance circuit of the second handwriting unit 313. That is, the controller 317 may perform a control to apply a current to the second handwriting unit 313 to generate the induction magnetic field.

Again referring to FIG. 3, the sensor 320 senses the touch input through the second handwriting unit 313 of the digital pen 310 during a period in which the digital pen 310 inputs the handwriting information to the paper. The sensor 320 may include an electromagnetic induction coil sensor (not illustrated) having a grid structure by including a plurality of loop coils each disposed in a predetermined first direction and a second direction intersecting with the first direction, and an electronic signal processing unit (not illustrated) sequentially providing alternating current (AC) signals having a predetermined frequency to each loop coil of the electromagnetic induction coil sensor.

For example, in the case in which it is sensed that the user inputs the handwriting information to the paper by using the first handwriting unit 311, the digital pen 310 may activate the resonance circuit of the second handwriting unit 313 to generate the induction magnetic field. The sensor 320 may sense the induction magnetic field generated through the loop coils disposed in a grid form. In addition, the sensor 320 may sense a position of the loop coil in which the induction magnetic field is sensed to sense the touch point.

In another example, when the digital pen 310 in which the resonance circuit is embedded is present in the vicinity of the loop coil of the sensor 320, a magnetic field transmitted from the loop coil may generate a current based on mutual electromagnetic induction in the resonance circuit within the digital pen 310. The induction magnetic field may be generated from a coil configuring the resonance circuit within the digital pen 310 based on this current, and the sensor 320 may detect the induction magnetic field from the loop coil that is in a signal receiving state to sense the touch point of the digital pen 310.

The sensor 320 may sense an access and a touch by any object that may generate a current based on the electromagnetic induction, and the case in which the sensor 320 is used only to sense an access or a touch by the digital pen 310 will be described in the exemplary embodiment.

The sensor 320 may include a plurality of sensors. The plurality of sensors may have unique IDs, respectively.

The communicator 330 is a component performing communication with various types of external devices or external servers in various types of communication schemes. For example, the communicator 330 may include various communication chips such as a Wi-Fi chip, a Bluetooth chip, an NFC chip, a wireless communication chip, and the like. Here, the Wi-Fi chip, the Bluetooth chip, and the NFC chip perform communication in a Wi-Fi scheme, a Bluetooth scheme, an NFC scheme, respectively. Among them, the NFC chip means a chip operated in the NFC scheme using a band of 13.56 MHz among various RFID frequency bands such as, for example, 135 kHz, 13.56 MHz, 433 MHz, 860-960 MHz, 2.45 GHz, and the like. In the case of using the Wi-Fi chip or the Bluetooth chip, various connection information such as, for example, an SSID, a session key, and the like, is first transmitted and received, and communication is connected by using the connection information. Then, various information may be transmitted and received. The wireless communication chip means a chip performing communication depending on various communication protocols such as, for example, IEEE, Zigbee, 3rd generation, 3rd generation partnership project (3GPP), long term evolution (LTE), and the like.

The communicator 330 may transmit the handwriting information to various external devices. In detail, in the case of performing the display function, the communicator 330 may transmit the handwriting information to the external electronic board 50. In the case of performing the individual transmission function, the communicator 330 may transmit the handwriting information to a terminal apparatus of a preset user.

The input unit 340 receives various user commands input for controlling the electronic conference system 10. The input unit 340 may receive user commands input for performing various functions using the handwriting information.

Figure 5:
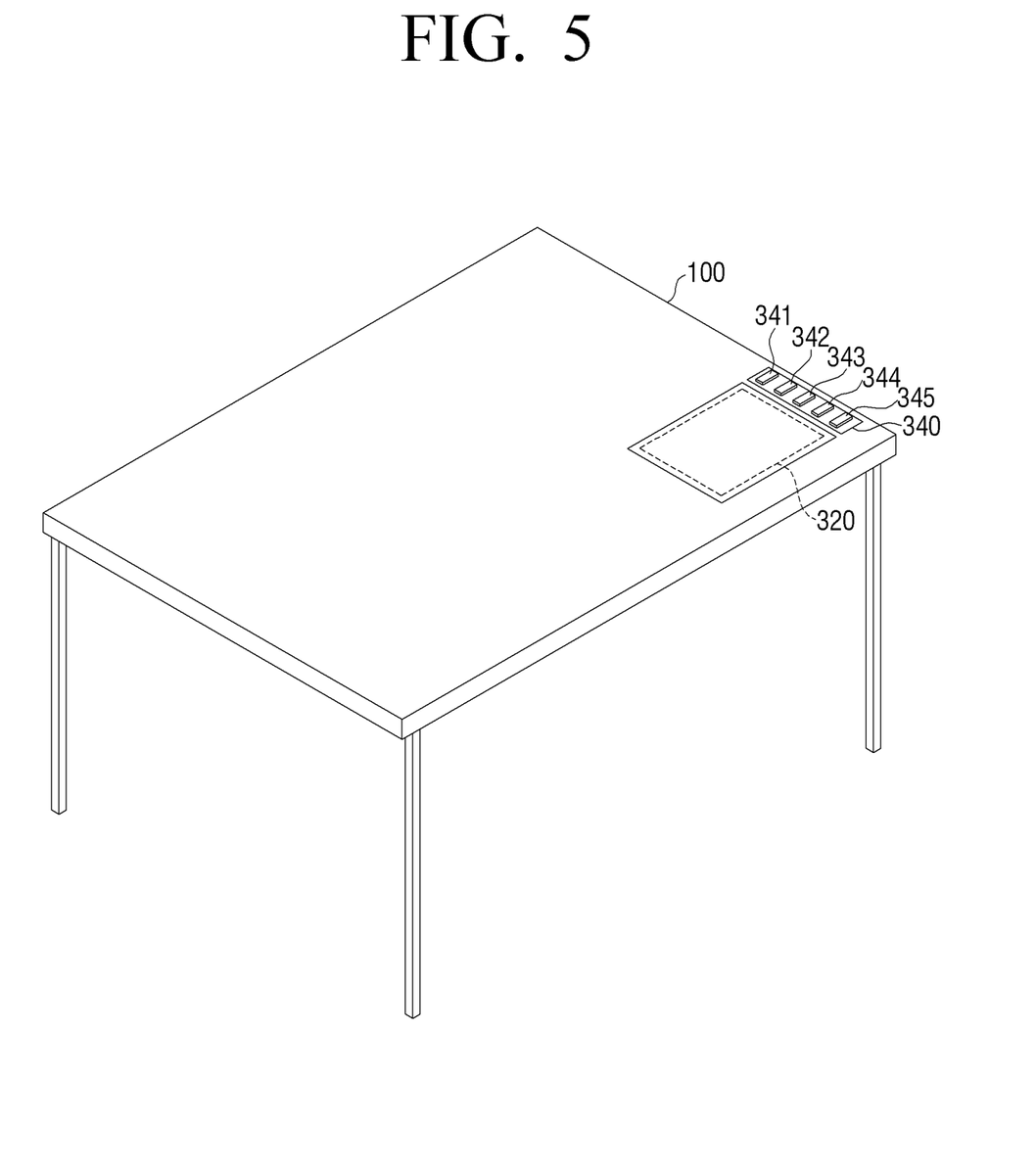
FIG. 5 is a view illustrating an input unit including a plurality of buttons according to an exemplary embodiment.

As shown in FIG. 5, the input unit 340 may include a plurality of buttons 341 to 345 according to an exemplary embodiment. The plurality of buttons may include a button 341 corresponding to the display function, a button 342 corresponding to the e-mail transmission function, a button 343 corresponding to the storing function, a button 344 corresponding to the individual transmission function, and a button 345 corresponding to the deleting function.

Although the case in which the input unit 340 includes the plurality of buttons 341 to 345 has been described in the above-mentioned exemplary embodiment, this is only an example. That is, the input unit may include, for example, a touch sensor, an audio input unit, and a motion input unit. That is, the input unit 340 may perform various functions of the electronic conference system 10 by using a touch input through the separate touch sensor different from the sensor 320, a user's audio input through the audio input unit, a user's motion input through the motion sensor 370, and the like.

Referring again to FIG. 3, the storage 350 stores various modules for controlling the electronic conference system 10. For example, software including a base module, a sensing module, a communication module, and a service module may be stored in the storage 350. Here, the base module is a base module processing signals transferred from each hardware included in the electronic conference system 10, and transferring the processed signals to an upper layer module. The sensing module, which is a module collecting information from various sensors and analyzing and managing the collected information, may include, for example, a face recognizing module, an audio recognizing module, a motion recognizing module, an NFC recognizing module, and the like. The communication module is a module for performing communication with the outside. The service module is a module including various applications for providing various services.

The storage 350 may store the handwriting information input by the digital pen 310 therein. Here, the handwriting information may include user information and information on the sensor 320 as well as handwriting content input by the digital pen 310.

The NFC transceiver 360 receives information on the paper through an NFC module attached to the paper. The NFC transceiver 360 may receive ID information and size information of the paper. In addition, the controller 390 may store the ID information and the size information of the paper received from the NFC transceiver 360 with the handwriting information. Therefore, the user of the paper may be confirmed through the ID information of the paper, and a size of a display may also be decided through the size information of the paper.

The motion sensor 370 senses a user's motion. The motion sensor 370 may sense a user's motion turning over the paper. The motion sensor 370 may sense a user's motion for performing a function. For example, in the case in which a user's motion pointing to the display apparatus 50 is sensed through the motion sensor 370, the controller 390 may control the communicator 330 to transmit the handwriting information to the display apparatus 50.

The user authenticator 380 is a component authenticating the user. The user authenticator 380 may authenticate the user of the paper by various methods. For example, the user authenticator 380 may authenticate the user by various recognizing methods such as a fingerprint recognizing method, an iris recognizing method, an audio recognizing method, and the like.

The controller 390 controls an operation of the electronic conference system 10.

The controller 390 generates the handwriting information by using the touch point sensed by the sensor 320. In more detail, the controller 390 may generate the handwriting information by using, for example, handwriting content generated by using a coordinate value of the touch point sensed by the sensor 320, the ID information of the sensor 320, the user information, and the like. In addition, the controller 390 may perform various functions by using the generated handwriting information.

The controller 390 may transmit the handwriting information to the external display apparatus 50 to allow the external display apparatus 50 to display the handwriting information.

Figure 6A:
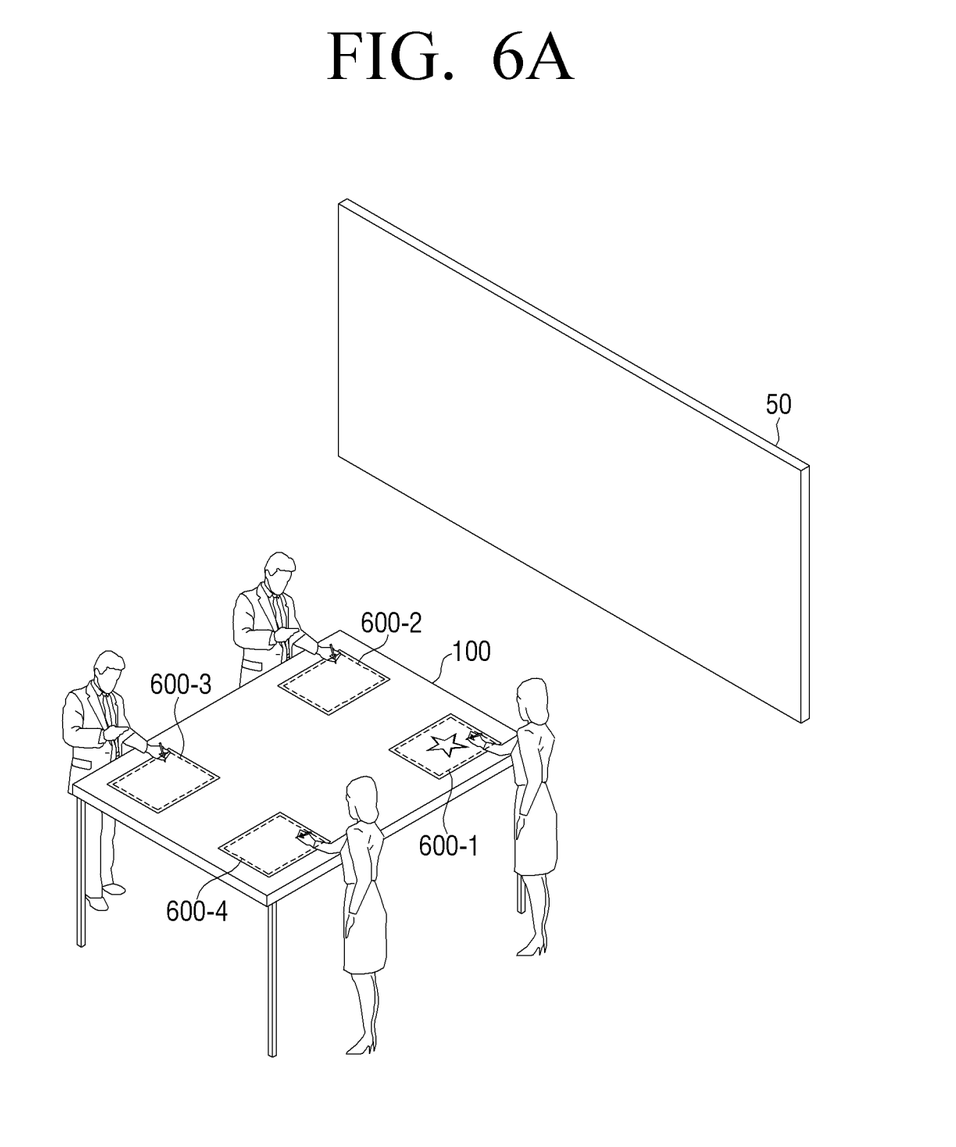
FIGS. 6A to 6D are views illustrating examples in which handwriting information input by a user is displayed on an external display apparatus according to an exemplary embodiment.

FIGS. 6A to 6D are views illustrating examples in which handwriting information input by a user is displayed on the external display apparatus 50 according to an exemplary embodiment. In detail, as illustrated in FIG. 6A, in the case in which a first user performs handwriting on a first sensor 600-1, the controller 390 generates first handwriting information based on handwriting content sensed through the sensor 320 and ID information of the first sensor 600-1. In addition, in the case in which the button 341 of FIG. 5 corresponding to the display function in the input unit 340 is selected, the controller 390 controls the communicator 330 to transmit the first handwriting information to the external display apparatus 50.

Figure 6B:
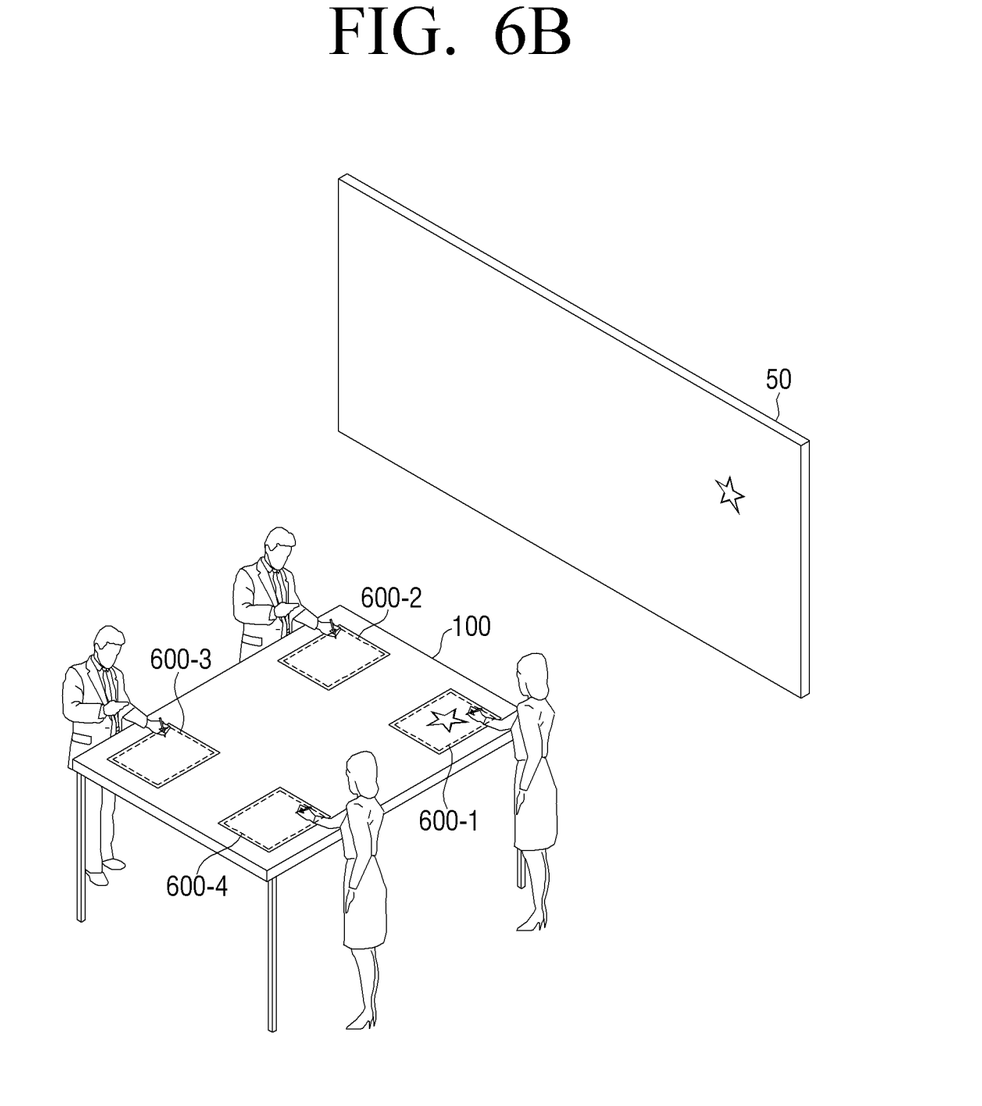

As illustrated in FIG. 6B, in the case in which the display apparatus 50 receives the first handwriting information, the display apparatus 50 displays the first handwriting information by a first color.

Figure 6C:
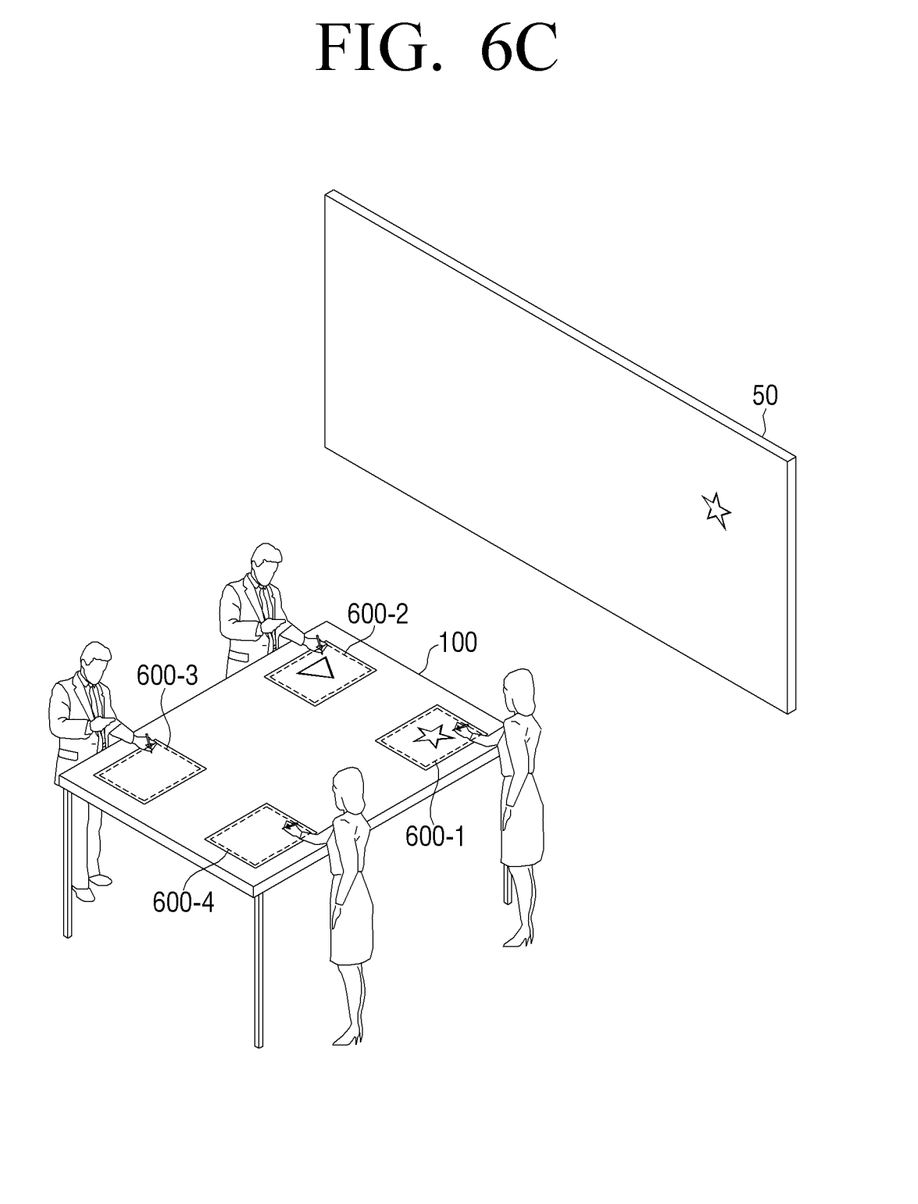

As illustrated in FIG. 6C, in the case in which a second user performs handwriting on a second sensor 600-2, the controller 390 generates second handwriting information based on handwriting content sensed through the sensor 320 and ID information of the second sensor 600-2. In addition, in the case in which the button 341 of FIG. 5 corresponding to the display function in the input unit 340 is again selected, the controller 390 controls the communicator 330 to transmit the second handwriting information to the external display apparatus 50.

Figure 6D:
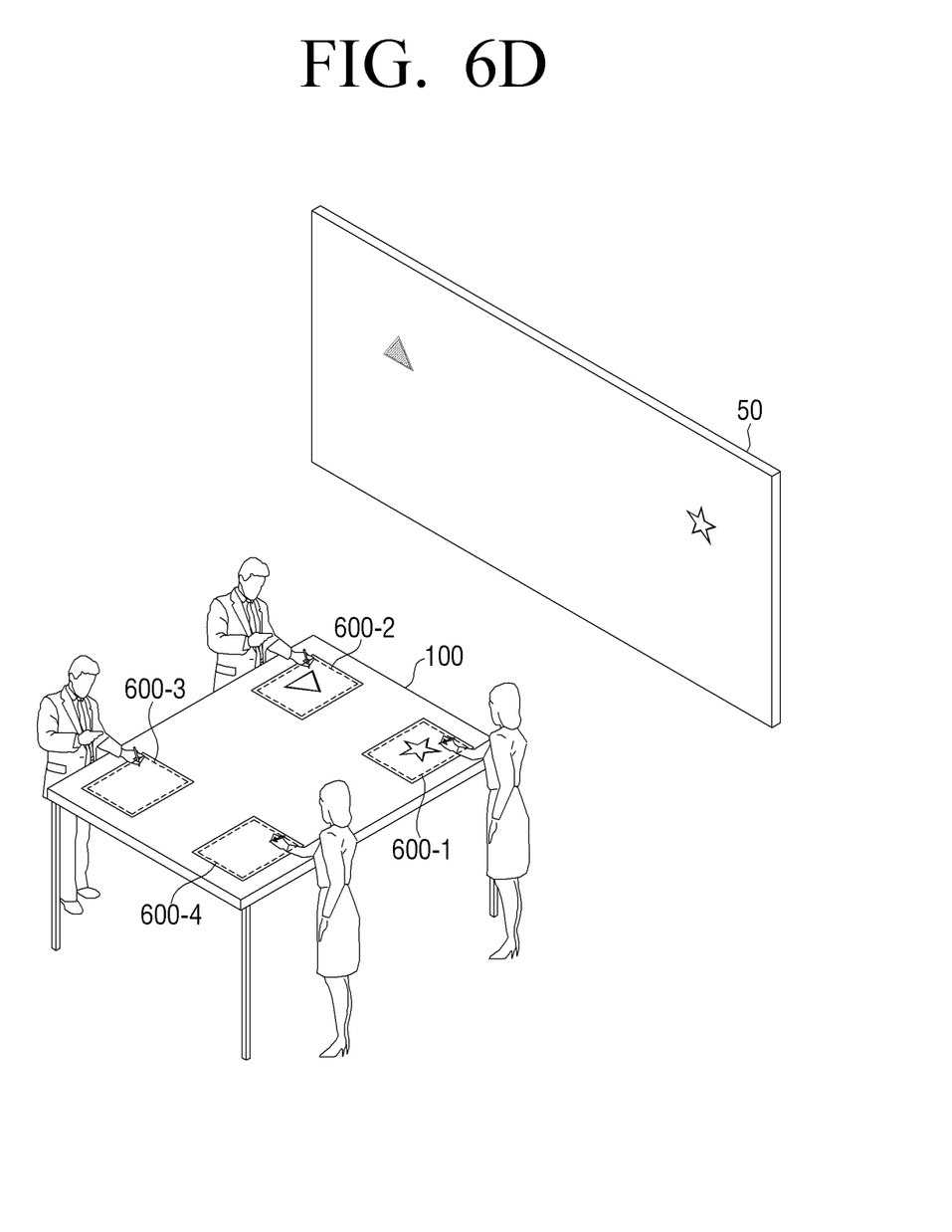

As illustrated in FIG. 6D, in the case in which the display apparatus 50 receives the second handwriting information, the display apparatus 50 displays the second handwriting information by a second color different from the first color.

Referring again to FIG. 3, the controller 390 may allow size information of the handwriting content that is to be displayed by the display apparatus 50 to be included in the handwriting information. Here, the controller 390 may set the size information so that the display apparatus 50 displays the handwriting content at the same size as that of the content handwritten on the paper by the user. However, this is only an example. That is, the controller 390 may set the size information so that the display apparatus 50 displays the handwriting content at a size different from that of the content handwritten on the paper by the user. Here, the controller 390 may manually set the size information of the handwriting content depending on an input of the user, or automatically set the size information of the handwriting content based on the size information of the display apparatus 50.

Although the case in which the handwriting information is transmitted after the handwriting is input and the button 341 of FIG. 5 corresponding to the display function is selected has been described in the above-mentioned exemplary embodiment, this is only an example. That is, the handwriting information may be transmitted to the display apparatus 50 while simultaneously being generated, such that the handwriting information generated by the user may be confirmed in real time.

In addition, in the case in which the button 342 of FIG. 5 corresponding to the e-mail transmission function in the input unit 340 is selected, the controller 390 may control the communicator 330 to transmit the generated handwriting information to a preset e-mail. In detail, in the case in which the first user that is authenticated performs handwriting, when the button 342 corresponding to the e-mail transmission function in the input unit 340 is selected during a period in which the first user performs the handwriting, the controller 390 may extract e-mail information in information of the first user that is authenticated, and control the communicator 330 to transmit the handwriting information to a server of the extracted e-mail account.

In addition, in the case in which the button 343 of FIG. 5 corresponding to the storing function in the input unit 340 is selected, the controller 390 may store the handwriting information in the storage 350. For example, the controller 390 may store various information such as the user information, information on a storing point in time, and the like, as well as the handwriting content.

In addition, in the case in which the button 344 of FIG. 5 corresponding to the individual transmission function in the input unit 340 is selected, the controller 390 may control the communicator 330 to transmit the handwriting information to a terminal of a preset individual. In detail, in the case in which at least one individual terminal (for example, a laptop computer, a tablet personal computer (PC), or the like) is connected to the electronic conference system 10, when a user command for selecting a button corresponding to an individual terminal to which the user is to transmit the handwriting information among the buttons included in the input unit 340 is input, the controller 390 may control the communicator 330 to transmit the handwriting information to the individual terminal corresponding to the button. Here, the individual terminal receiving the handwriting information may display the handwriting information together with a message informing that the handwriting information has been received.

In addition, when a user command for selecting the button 345 of FIG. 5 corresponding to the deleting function in the input unit 340 is input, the controller 390 may delete the handwriting information generated up to a time at which the button 345 is input.

Further, in the case in which the user's motion turning over the paper is sensed by the motion sensor 370, the controller 390 may store, in the storage 350, the handwriting information generated up to a point in time in which the user's motion turning over the paper is sensed. In addition, in the case in which the touch point of the digital pen 310 is again sensed through the second handwriting unit 313, the controller 390 may generate new handwriting information based on a new touch point sensed by the sensor 320. That is, the user's motion turning over the paper may be recognized as an instruction to store the new handwriting information in a new storing region and/or to display the new handwriting information in a new display region.

In addition, in the case in which information on the paper is received through the NFC transceiver 360, the controller 390 may store the information on the paper received from the NFC transceiver 360 together with the handwriting information. Further, the controller 390 may store information on the user authenticated from the user authenticator 380 together with the handwriting information.

Through the electronic conference system 10 according to the exemplary embodiment as described above, the user may share his/her handwriting content with external conference participants while actually performing the handwriting on the paper by using the digital pen 310. Therefore, a more convenient and intuitive conference may be performed through the electronic conference system 10.

Figure 7:
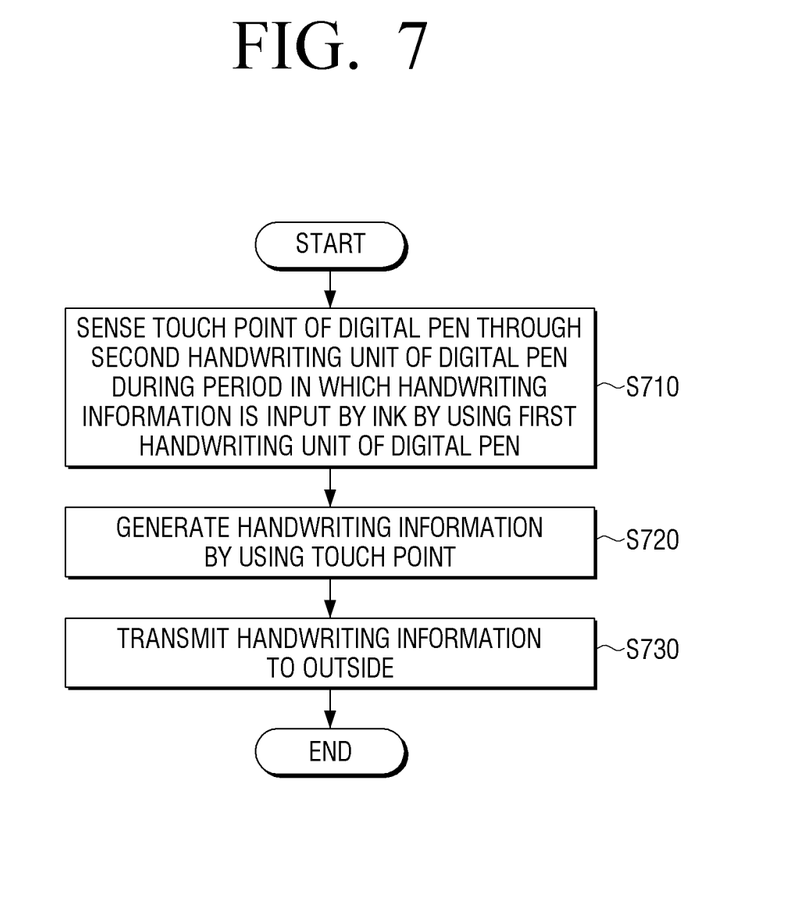
FIG. 7 is a flowchart illustrating a method for controlling an electronic conference system according to an exemplary embodiment.

FIG. 7 is a flowchart illustrating a method for controlling the electronic conference system 10 according to an exemplary embodiment.

In operation S710, the electronic conference system 10 senses the touch point of the digital pen 110 through the second handwriting unit of the digital pen 110 during a period in which the handwriting information is input by the ink by using the first handwriting unit of the digital pen 110. That is, the user may digitize and input the handwriting content to the electronic conference system 10 while simultaneously and directly performing the handwriting by using the digital pen 110.

In operation S720, the electronic conference system 10 generates the handwriting information by using the touch point. For example, the handwriting information may include the user information, the ID information of the sensor 120, and the like, as well as the handwriting content written by the user.

In operation S730, the electronic conference system 10 transmits the generated handwriting information to the outside. For example, the electronic conference system 10 may transmit the generated handwriting information to the external display apparatus 50 to display the handwriting information, or may transmit the generated handwriting information to the external individual terminal or e-mail server, depending on the user command.

Although the case in which the handwriting information is digitized to provide various services when the handwriting is performed in any region of the entire region of the paper by using the digital pen 110 has been described in the above-mentioned exemplary embodiment, this is only an example. That is, when the handwriting is performed in a first region of the entire region of the paper, the handwriting information may be digitized, and the handwriting may be performed by using only the first handwriting unit in a second region other than the first region of the entire region. That is, the user may perform the setting so that electronic handwriting is possible in only the first region of the entire region of the paper and ink handwriting is possible in the second region other than the first region of the entire region.

As set forth above, according to various exemplary embodiments, a natural and intuitive handwriting sense may be provided to the user during a period in which a conference is performed by using the electronic conference system. In addition, various functions are provided by using the handwriting information input by the user, thereby making it possible to more conveniently manage the handwriting information input during a conference time.

In addition, the exemplary embodiments may also be implemented through computer-readable code and/or instructions on a medium, e.g., a non-transitory computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic system comprising:
   a digital pen comprising:
      a first hand writer configured to input handwriting to a paper;
      a pressure-sensitive sensor configured to sense pressure that is applied to a tip portion of the digital pen while the handwriting is input to the paper by the first hand writer; and
      a second hand writer configured to, based on the pressure applied to the tip portion of the digital pen being sensed by the pressure-sensitive sensor, apply a current to a coil to activate the coil so that the coil generates an induction magnetic field; and
   an electronic device comprising:
      a sensor for placing the paper on;
      a communicator; and
      a first controller configured to:

based on the sensor sensing the induction magnetic field generated by the second hand writer during a period in which the pressure-sensitive sensor senses the pressure, obtain handwriting information corresponding to the induction magnetic field sensed by the sensor; and based on a user input for transmitting the handwriting information to an external display apparatus, control the communicator to transmit the handwriting information to the external display apparatus.

2. The electronic system as claimed in claim 1, wherein the handwriting information is displayed on the external display apparatus in a size different from the handwriting.

3. The electronic system as claimed in claim 1, wherein the handwriting information is generated and stored during a period in which the handwriting is input to the paper by using the first hand writer.

4. The electronic system as claimed in claim 1, wherein the handwriting information comprises handwriting content corresponding to the handwriting and comprises time information on writing time of the handwriting.

5. The electronic system as claimed in claim 1, wherein the first controller is further configured to control the communicator to transmit the handwriting information to the external display apparatus in real time while the handwriting is input to the paper by the first hand writer.

6. The electronic system as claimed in claim 1, wherein the handwriting information is displayed on the external display apparatus in a predetermined color.

7. The electronic system as claimed in claim 1, wherein the second hand writer is further configured to, in response to a magnetic field that is transmitted from the electronic device, generate the induction magnetic field, and wherein the sensor is further configured to sense the handwriting input to the paper, based on the induction magnetic field generated by the second hand writer.

8. The electronic system as claimed in claim 1, wherein the second hand writer comprises:

the coil; and a second controller separate from the first controller and configured to, based on the pressure applied to the tip portion of the digital pen being sensed by the pressure-sensitive sensor while the handwriting is input to the paper by the first hand writer, apply the current to the coil to activate the coil so that the coil generates the induction magnetic field.

9. The electronic system as claimed in claim 1, wherein the electronic device does not include a display.

10. The electronic system as claimed in claim 1, wherein the electronic device further comprises a physical button, and wherein the first controller is further configured to, based on a selection of the physical button, control the communicator to transmit the handwriting information to the external display apparatus.

11. The electronic system as claimed in claim 1, wherein the first controller is further configured to, based on the pressure applied to the tip portion of the digital pen being sensed by the pressure-sensitive sensor while the handwriting is input to the paper by the first hand writer, obtain the handwriting information corresponding to the handwriting input to the paper.

* * * * *